(12) United States Patent
Lim

(10) Patent No.: US 10,107,237 B2
(45) Date of Patent: Oct. 23, 2018

(54) EXHAUST GAS RECIRCULATION VALVE DEVICE FOR VEHICLE

(71) Applicant: HYUNDAI MOTOR COMPANY, Seoul (KR)

(72) Inventor: Jaepil Lim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 11 days.

(21) Appl. No.: 15/263,966

(22) Filed: Sep. 13, 2016

(65) Prior Publication Data

US 2017/0268466 A1 Sep. 21, 2017

(30) Foreign Application Priority Data

Mar. 16, 2016 (KR) .......................... 10-2016-0031695

(51) Int. Cl.
*F02M 26/70* (2016.01)
*F16K 1/22* (2006.01)
*F16K 1/226* (2006.01)
*F16K 31/44* (2006.01)
*F16K 31/04* (2006.01)

(52) U.S. Cl.
CPC ............. *F02M 26/70* (2016.02); *F16K 1/221* (2013.01); *F16K 1/223* (2013.01); *F16K 1/2263* (2013.01); *F16K 31/043* (2013.01); *F16K 31/44* (2013.01)

(58) Field of Classification Search
CPC ........ F16K 31/44; F16K 1/2263; F16K 1/221; F16K 1/223; F16K 31/043; F02M 26/70; F02M 25/0796; F02M 26/38; F01L 5/02; F01L 7/16; F01L 3/08; F01L 2003/11

USPC ............... 251/301, 308; 277/502; 123/568.2, 123/80 R, 80 D, 80 DA, 80 BA

See application file for complete search history.

(56) References Cited

U.S. PATENT DOCUMENTS 3,096,071 A * 7/1963 Fisher ..................... F16K 1/226
251/175
3,127,904 A * 4/1964 Stillwagon ............ F16K 1/2265
137/315.24
4,291,863 A * 9/1981 Gachot ................. F16K 1/2268
251/214

(Continued)

FOREIGN PATENT DOCUMENTS

JP 2005-282520 A 10/2005
KR 10-2011-0041265 A 4/2011

(Continued)

*Primary Examiner* — Craig J Price
*Assistant Examiner* — Andrew J Rost
(74) *Attorney, Agent, or Firm* — Brinks Gilson & Lione

(57) ABSTRACT

An exhaust gas recirculation valve device for a vehicle includes: a valve housing having an exhaust gas inlet port and an exhaust gas outlet port; a flap valve rotatably mounted on the valve housing to open and close the exhaust gas outlet port; a valve shaft fitted to penetrate the flap valve and coupled to the flap valve so as to rotate integrally with the flap valve; a lever in which one end of the valve shaft is fitted to penetrate; a spring fixed at the lever and mounted on an exterior circumferential surface of the valve shaft; a bush inserted into the exterior circumferential surface of the valve shaft between the spring and the flap valve in a shaft direction; and a thrust washer installed between the flap valve and the bush.

8 Claims, 3 Drawing Sheets

(56) References Cited

U.S. PATENT DOCUMENTS

| | | | | |
|---|---|---|---|---|
| 4,394,003 A | * | 7/1983 | Whitaker | F16K 1/2266 |
| | | | | 251/173 |
| 5,630,571 A | * | 5/1997 | Kipp | F02D 9/06 |
| | | | | 251/214 |
| 9,121,511 B2 | * | 9/2015 | Hodebourg | F02D 9/04 |
| 2012/0193562 A1 | * | 8/2012 | Takai | F02D 9/106 |
| | | | | 251/214 |
| 2013/0001882 A1 | * | 1/2013 | Voigtlaender | F02D 9/106 |
| | | | | 277/350 |
| 2014/0182567 A1 | * | 7/2014 | Lim | F02M 25/0787 |
| | | | | 123/568.12 |

FOREIGN PATENT DOCUMENTS

| | | |
|---|---|---|
| KR | 10-1057067 B1 | 8/2011 |
| KR | 10-2013-0135892 A | 12/2013 |
| KR | 10-2014-0001881 A | 1/2014 |
| KR | 10-2014-0085134 A | 7/2014 |
| KR | 10-2015-0071929 A | 6/2015 |

* cited by examiner

EXHAUST GAS RECIRCULATION VALVE DEVICE FOR VEHICLE

CROSS-REFERENCE TO RELATED APPLICATION

This application claims priority to and the benefit of Korean Patent Application No. 10-2016-0031695, filed on Mar. 16, 2016, which is incorporated by reference in its entirety.

FIELD

The present disclosure relates to an exhaust gas recirculation (EGR) valve device for vehicle.

BACKGROUND

The statements in this section merely provide background information related to the present disclosure and may not constitute prior art.

In general, large amounts of harmful substances to humans such as carbon monoxide and nitrogen oxides are contained in exhaust gases emitted from a vehicle engine. Strict regulations are being enforced on nitrogen oxides because the nitrogen oxides are particularly harmful in that they contribute to acid rain, global warming, and respiratory problems.

The nitrogen oxides have the property that, as the combustion temperature of fuel in the engine increases, so does the amount of nitrogen oxides.

Many attempts have been made to reduce nitrogen oxide emissions, among which an exhaust gas recirculation (EGR) system is usually applied to vehicles.

The EGR system recirculates part of the exhaust gas emitted from the engine after fuel combustion to an intake system of the engine to direct it back to a combustion chamber of the engine. As a consequence, an air-fuel mixture decreases in density without a change in the air-fuel ratio of then air-fuel mixture, thus lowering the combustion temperature.

That is, the EGR system supplies part of exhaust gas to an intake manifold of the engine to direct it to the combustion chamber when there is a need to reduce nitrogen oxide emissions depending on the operating state of the engine. By doing so, exhaust gases, which are insert gases whose volume does not change, contribute to decrease the density of the mixture to a lower level and therefore decrease the flame propagation velocity during fuel combustion. This suppresses an increase in combustion temperature and slows the fuel combustion, thereby suppressing the generation of nitrogen oxides.

The EGR system according to a prior art as described above is installed between exhaust system and intake system and supplies exhaust gas exhausted from the engine along exhaust passage as needed. Further, the EGR system further includes an EGR cooler, and the EGR cooler cools exhaust gas temperature supplied to the intake system by heat exchange.

The EGR system includes an EGR valve device, and the EGR valve device includes an actuator controlled by electric control unit, an operation rod transmitting operating power of the actuator and a flap valve being rotated by the operation rod and opening and closing a port connected to the EGR cooler.

The flap valve is installed to be rotatable by means of a valve shaft to a valve housing, and the valve shaft is connected with the operation rod by a lever.

The valve shaft is integrally attached to the lever by metal inert gas welding (MIG) generally and rotatably connected to flap valve by MIG welding and riveting integrally.

By the way, exhaust gas is minutely leaked through a gap between outer diameter of the valve shaft and the lever during valve opening and closing.

SUMMARY

The present disclosure provides an exhaust gas recirculation valve device for vehicle having multi sealing structure so that exhaust gas is not minutely leaked through a gap of interior diameter of components.

An exhaust gas recirculation valve device for vehicle according to one form of the present disclosure includes: a valve housing having an exhaust gas inlet port and an exhaust gas outlet port; a flap valve rotatably mounted on the valve housing to open and close the exhaust gas outlet port; a valve shaft fitted to penetrate the flap valve and coupled to the flap valve so as to rotate integrally with the flap valve; a lever in which one end of the valve shaft is fitted to penetrate; a spring fixed at the lever and mounted on an exterior circumferential surface of the valve shaft; a bush inserted into the exterior circumferential surface of the valve shaft between the spring and the flap valve in the shaft direction; and a thrust washer installed between the flap valve and the bush.

One end of the valve shaft may be fitted to penetrate the lever and coupled to the lever by welding, and the lever may be connected to an actuator through an operating rod.

The exhaust gas inlet port may be communicatively connected to an exhaust passage, and the exhaust gas outlet port may be communicatively connected to an EGR cooler.

The exhaust gas recirculation valve device for vehicle according to the present disclosure may further include a plane washer mounted between the bush and the spring.

The valve shaft may include a stepped portion formed on the circumferential surface and stepped toward inner side of diameter, and the plane washer may be mounted on the stepped portion of the valve shaft.

The exhaust gas recirculation valve device for vehicle according to the present disclosure may further include a wave washer mounted between the valve housing and an end portion of the lever.

Further, an exhaust gas recirculation valve device for vehicle according to the present disclosure includes: a valve housing having an exhaust gas inlet port and an exhaust gas outlet port; a valve shaft rotatably penetrating the valve housing; a bush mounted between the valve housing and the valve shaft to smoothly rotate the valve shaft; a flap valve disposed apart from the bush to an axial direction to be fixedly mounted on the valve shaft to open and close the exhaust gas outlet port; and a thrust washer installed between the flap valve and the bush.

The valve shaft may include a stepped portion formed on the circumferential surface and stepped toward inner side of diameter, one end of the bush of the opposite of the flap valve may be located on the stepped portion, and the exhaust gas recirculation valve device may further include a plane washer closing and sealing a portion between one end of the bush and the stepped portion.

The exhaust gas recirculation valve device for vehicle may further include a lever in which one end of the valve shaft is inserted, other end of the lever may be configured to be extended to the valve housing, and a wave washer may be interposed between the other end of the lever and the valve housing.

The lever and the plane washer may be configured to supply a spring sheet for a spring disposed between the lever and the plane washer.

According to another form of the present disclosure, the exhaust gas recirculation valve device for vehicle may include a multi sealing structure between the valve shaft and the valve housing so that exhaust gas is not minutely leaked through a gap of interior diameter of components during valve opening and closing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
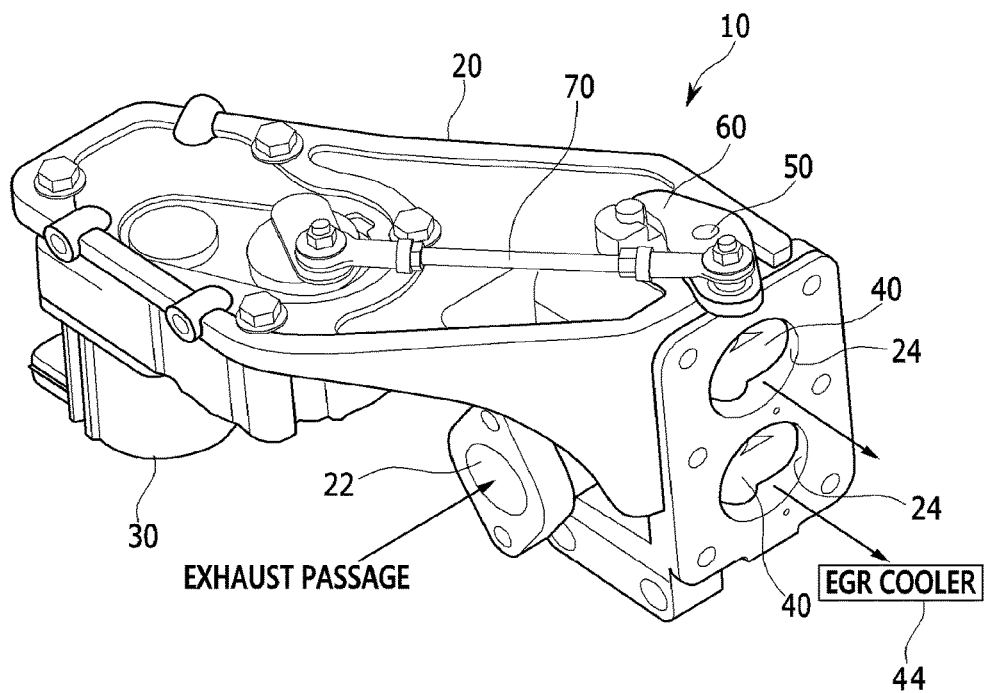
FIG. 1 is a schematic drawing of an exhaust gas recirculation valve device for vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Further, in the exemplary forms, since like reference numerals designate like elements having the same configuration, a first exemplary form is representatively described, and in other exemplary forms, only a configuration different from the first exemplary form will be described.

It shall be noted that the drawings are schematic and do not depict exact dimensions. The relative proportions and ratios of elements in the drawings may be exaggerated or diminished in size for the sake of clarity and convenience in the drawings, and such arbitrary proportions are only illustrative and not limiting in any way. When one part is said to be "over" or "on" another part, the one part may be directly over the other part or may be accompanied by another part interposed therebetween.

Hereinafter, an exhaust gas recirculation valve device for vehicle according to one form of the present disclosure will be described in detail with reference to FIG. 1 to FIG. 3.

Figure 2:
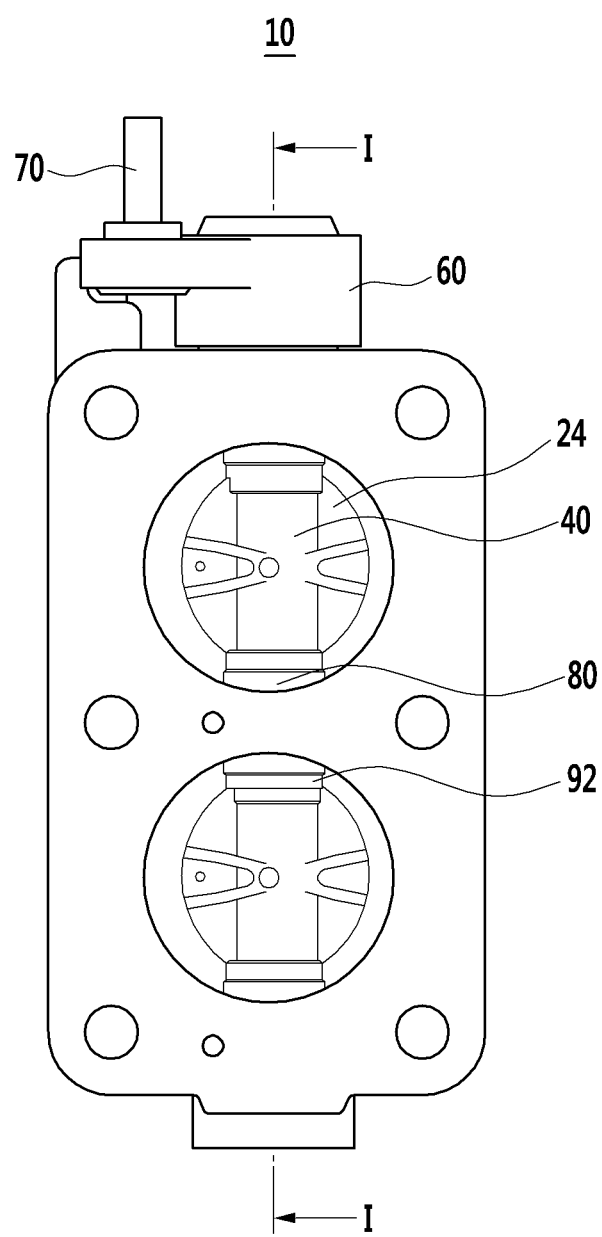
FIG. 2 is a top plane view of an exhaust gas recirculation valve device for vehicle.
Figure 3:
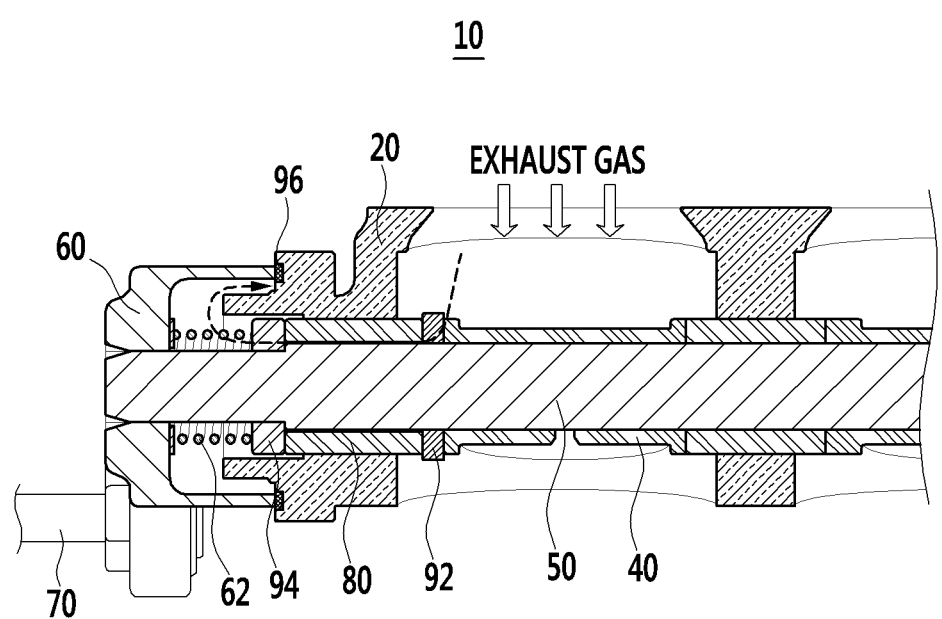
FIG. 3 is a cross-sectional view taken along I-I of FIG. 2.

FIG. 1 is a schematic drawing of an exhaust gas recirculation valve device for vehicle, FIG. 2 is a top plane view of an exhaust gas recirculation valve device, and FIG. 3 is a cross-sectional view taken along I-I of FIG. 2.

An exhaust gas recirculation valve device for vehicle according to the present disclosure is installed between an exhaust pipe and intake manifold or intake duct to regulate amount of exhaust gas exhausted from engine and supplied to the intake manifold or the intake duct through the exhaust pipe.

Referring to FIG. 1 to FIG. 3, an exhaust gas recirculation valve device for vehicle 10 includes: a valve housing 20, a flap valve 40, a valve shaft 50, a lever 60, a spring 62, a bush 80, and a thrust washer 92.

An exhaust gas inlet port 22 and an exhaust gas outlet port 24 are provided on the valve housing 20. The exhaust gas inlet port 22 is connected to an exhaust passage provided on the opposite side of the portion where the actuator 30 is mounted, the exhaust gas outlet port 24 is provided at portion rotated 90 degrees counterclockwise from the exhaust gas inlet port 22.

The exhaust gas outlet port 24 is connected to an EGR cooler 44.

The exhaust gas outlet port 24 may be provided two, but may be one or more.

Exhaust gas emitted from the engine after combustion is directed into the valve housing 20 via the exhaust gas inlet port 22 through the exhaust passage, then passes through the two exhaust gas outlet ports 24 and is directed into the EGR cooler 44. Then, the exhaust gas is properly cooled in the EGR cooler 44, and then directed back to the engine through an intake device, thereby achieving recirculation.

The flap valve 40 is rotatably mounted on the valve housing 20 to open and close the exhaust gas outlet port 24, and the valve shaft 50 is fitted to penetrate the flap valve 40 and coupled to the flap valve 40 so as to rotate integrally with the flap valve 40.

One end of the valve shaft 50 is fitted to penetrate the lever 60 and connected integrally with the lever 60, and one part of the lever 60 is connected to the operating rod 70. The valve shaft 50 may be coupled with the lever 60 by welding, for example electron beam welding. As known in the art, electron beam welding involves radiating an electron beam, focused at high density and accelerated, to a welding object at high speed under vacuum atmosphere. As electrons of the radiated electron beam collide with the welding object, the kinetic energy of the electrons is converted into heat energy and locally generates high-temperature heat, and a welding surface is heated and melted with the thus-generated high-temperature heat, thus enabling bonding of the welding object.

The operating rod 70 is connected to the actuator 30 so as to receive operating force from the actuator 30.

Accordingly, when the actuator 30 is put into operation upon receipt of an operation control signal from a controller (not shown), the operating rod 70 is rotated by the actuator 30, and the rotating motion of the operating rod 70 is directly transferred to the lever 60, thereby causing the lever 60 to rotate.

The valve shaft 50 rotates in synchronization with the rotating motion of the lever 60, and the flap valve 40 also rotates together with the rotating motion of the valve shaft 50 to thereby open and close the exhaust gas outlet ports 24.

In addition, the spring 62 is fitted to the lever 60 and mounted on the circumferential surface of the valve shaft 50. The spring 62 inhibits or prevents brittleness of the bush 80 and the thrust washer 92 by movement of the flap valve 40.

The bush 80 is fitted and mounted on the circumferential surface of the valve shaft 50, above and below the portion where the flap valve 40 is mounted, and the thrust washer 92 is provided between the flap valve 40 and the bush 80. The bushes 80 may be used to rotatably assemble the valve shaft 50 and the flap valve 40 to the valve housing 20 and made of a stainless steel or T400.

The thrust washer 92 may block exhaust gas for the first time so that exhaust gas inflowed through the exhaust gas inlet port 22 may not be leaked toward minute space between the valve shaft 50 and the bush 80.

In addition, the exhaust gas recirculation valve device 10 for a vehicle may further include a plane washer 94 mounted between the bush 80 and the spring 62. Exhaust gas may be blocked for the second time such that the exhaust gas leaked into the minute space between the valve shaft 50 and the bush 80 may not be leaked toward the lever 60. The valve shaft 50 may include a stepped portion formed on the circumferential surface and stepped toward inner side of diameter, one end of the bush of the opposite of the flap valve may be located on the stepped portion, and the plane washer 94 may be installed between one end of the bush 80 and the stepped portion to improve close contacting property.

Further, the exhaust gas recirculation valve device 10 for a vehicle vehicle may further include a wave washer 96 mounted between the valve housing 20 and an end portion of the lever 60. The wave washer 96 supports continuously the gap between the valve housing 20 and the lever 60 by spring elastic force to fix shock, cushion and the location in the range of predetermined gap and decrease noise and inhibit or prevent from reducing of life span.

Further, the wave washer 96 is mounted so that exhaust gas penetrated the minute space between the valve shaft 50 and the plane washer 94 does not penetrate through the minute space between the valve housing 20 and the lever 60 to block the exhaust gas for the third time.

Like this, the exhaust gas recirculation valve device for a vehicle includes a multi sealing structure including a thrust washer, a plane washer, and a wave washer between the valve shaft and the valve housing so that exhaust gas is not minutely leaked through a gap of interior diameter of components during valve opening and closing.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

| | |
|---|---|
| 10: exhaust gas recirculation valve device for vehicle | |
| 20: valve housing | 22: exhaust gas inlet port |
| 24: exhaust gas outlet port | 30: actuator |
| 40: flap valve | 50: valve shaft |
| 60: lever | 62: spring |
| 70: operating rod | 80: bush |
| 92: thrust washer | 94: plane washer |
| 96: wave washer | |

What is claimed is:

1. An exhaust gas recirculation valve device for a vehicle, comprising:
   a valve housing having an exhaust gas inlet port and an exhaust gas outlet port;
   a flap valve rotatably mounted on the valve housing and configured to open and close the exhaust gas outlet port;
   a valve shaft fitted to penetrate the flap valve and coupled to the flap valve so as to rotate integrally with the flap valve;
   a lever to which one end of the valve shaft is fitted to penetrate;
   a spring fixed at the lever and mounted on an exterior circumferential surface of the valve shaft;
   a bush inserted into the exterior circumferential surface of the valve shaft between the spring and the flap valve in an axial direction of the valve shaft;
   a thrust washer installed between the flap valve and the bush,
   a plane washer mounted between the bush and the spring; and
   a wave washer mounted between the valve housing and an extended end portion of the lever that is extended from a body portion of the lever along the axial direction and abuts with the valve housing via the wave washer, such that the wave washer is configured to seal a space formed between the valve housing and the lever.

2. The exhaust gas recirculation valve device of claim 1, wherein one end of the valve shaft is fitted to penetrate the lever and coupled to the lever by welding, and the lever is connected to an actuator through an operating rod.

3. The exhaust gas recirculation valve device of claim 1, wherein the exhaust gas inlet port is communicatively connected to an exhaust passage.

4. The exhaust gas recirculation valve device of claim 1, wherein the valve shaft includes a stepped portion formed on the exterior circumferential surface and stepped radially inward from an outer diameter of the valve shaft, and the plane washer is mounted on the stepped portion of the valve shaft.

5. An exhaust gas recirculation valve device for a vehicle, comprising:
   a valve housing having an exhaust gas inlet port and an exhaust gas outlet port;
   a valve shaft rotatably penetrating the valve housing;
   a bush mounted between the valve housing and the valve shaft to smoothly rotate the valve shaft;
   a flap valve disposed apart from the bush in an axial direction to be fixedly mounted on the valve shaft to open and close the exhaust gas outlet port;
   a thrust washer installed between the flap valve and the bush,
   a plane washer mounted between the bush and a spring; and
   a wave washer mounted between the valve housing and an extended end portion of a lever that is extended from a body portion of the lever along the axial direction and abuts with the valve housing via the wave washer, such that the wave washer is configured to seal a space formed between the valve housing and the lever.

6. The exhaust gas recirculation valve device of claim 5, wherein the valve shaft includes a stepped portion formed on a circumferential surface and stepped radially inward from an outer diameter of the valve shaft,
   one end of the bush on an opposite side of the flap valve is located on the stepped portion, and
   the plane washer is configured to close and seal a portion between the one end of the bush and the stepped portion.

7. The exhaust gas recirculation valve device of claim 6, wherein one end of the valve shaft is inserted to the lever.

8. The exhaust gas recirculation valve device of claim 7, wherein the lever and the plane washer are configured to supply a spring sheet for the spring disposed between the lever and the plane washer.

* * * * *